No. 887,265. PATENTED MAY 12, 1908.
W. NICE, Jr.
BALL BEARING.
APPLICATION FILED MAY 16, 1906.
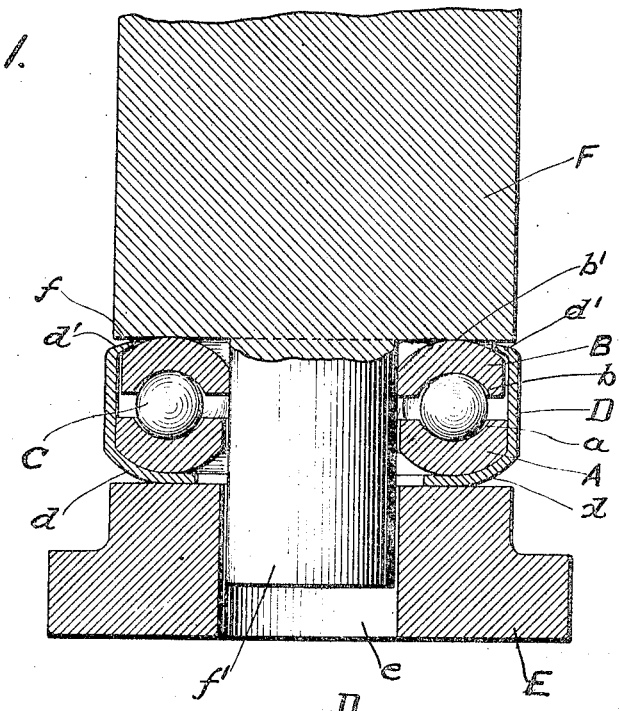
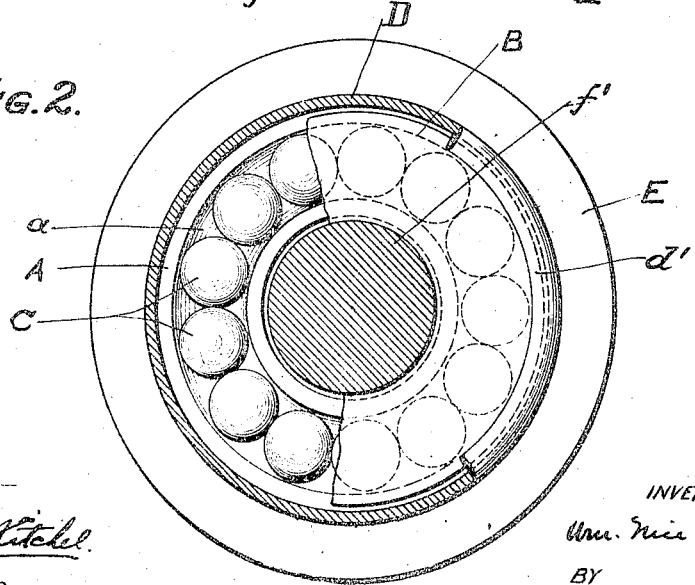
WITNESSES:—
INVENTOR
BY
ATTORNEY.

UNITED STATES PATENT OFFICE.

WILLIAM NICE, JR., OGONTZ, PENNSYLVANIA, ASSIGNOR TO PRESSED STEEL MANUFACTURING COMPANY, OF ATCO, NEW JERSEY, A CORPORATION.

BALL-BEARING.

No. 887,265.　　　Specification of Letters Patent.　　　Patented May 12, 1908.

Application filed May 16, 1906. Serial No. 317,129.

*To all whom it may concern:*

Be it known that I, WILLIAM NICE, Jr., a citizen of the United States, and resident of Ogontz, in the county of Montgomery and State of Pennsylvania, have invented certain Improvements in Ball-Bearings, of which the following is a specification.

This invention is a ball-bearing adapted particularly for taking a thrust, as in the case of holding a worm shaft, a propeller shaft or other constructions subjected to a longitudinal force, and its primary purpose is to provide a simple, inexpensive and efficient construction for such use.

In the accompanying drawings, Figure 1 represents a transverse sectional view of my improved bearing disposed between a shaft and a step therefor, and Fig. 2 represents a sectional plan view of the same.

The bearing comprises the pressed steel rings A and B, preferably concavo-convex, provided respectively with the annular races $a$ and $b$ between which are disposed steel balls C. The rings are held together by the soft metal band D having the bottom flange $d$ turned under the ring A to provide a seat therefor and the top flange $d'$ turned over the edge of the ring B to hold it in position with reference to the ring A and the balls C, the ring B having the top convexity $b'$ extending above the flange $d'$.

In the usual application of the improvements, a step E provided with the aperture $e$ has the flange $d$ resting thereon to support the ball-bearing, and a shaft F is provided with a bearing $f$ resting on a crown of the ring B and a boss of reduced extension $f''$ extending through the rings and band of the ball-bearing into the aperture $e$ of the step.

The periphery of the ring A is of larger diameter than the periphery of the ring B, and the opening through the ring A is of larger diameter than the opening through the ring B, so that the cylindrical projection $f''$ of the shaft F can turn easily without contact with the ring A, and so that the ring B can be fitted snugly on the part $f''$ and turned freely without contact with the band D.

It will be understood that in this construction the thrust of the shaft F is carried by the ring B through the balls C, the ring A and the flange $d$ of the band D to the step E, the bottom ring being held stationary by friction, while the top ring is held frictionally to the shaft and revolves freely on the balls without wearing upon the band.

By the foregoing construction parts are provided that can be pressed out, by means of dies, uniformly and at low cost, and assembled very readily. The rings are subjected to no wear excepting from the balls and the soft metal jacket flanged over the edge of the revolving ring and turned under the edge of the stationary ring so as to receive the thrust confines the parts so that they cannot possibly separate and forms a pillow which prevents breakage from sudden jars.

Having described my invention I claim:—

A ball bearing comprising a pair of concavo-convex rings having races therein, one of said rings having greater interior and exterior diameters than the other, balls in said races between said rings, a soft metal band having a diameter larger than the exterior diameter of said ring of smaller diameters and flanges which engage the convex surfaces of the respective rings, a bearing for supporting said ring of larger diameters, and a shaft having a bearing resting upon the convex surface of said ring of smaller diameters without making contact with the flange engaging said ring, said shaft having a reduced part upon which said ring of smaller diameters is fixed.

In testimony whereof I have hereunto set my name this 14th day of May, 1906, in the presence of the subscribing witnesses.

WM. NICE, JR.

Witnesses:
ROBERT JAMES EARLEY,
JOS. G. DENNY, Jr.